Feb. 22, 1949.  L. A. KILGORE ET AL  2,462,201
ELECTRICAL AIRPLANE PROPULSION
Filed Feb. 2, 1943  2 Sheets-Sheet 1
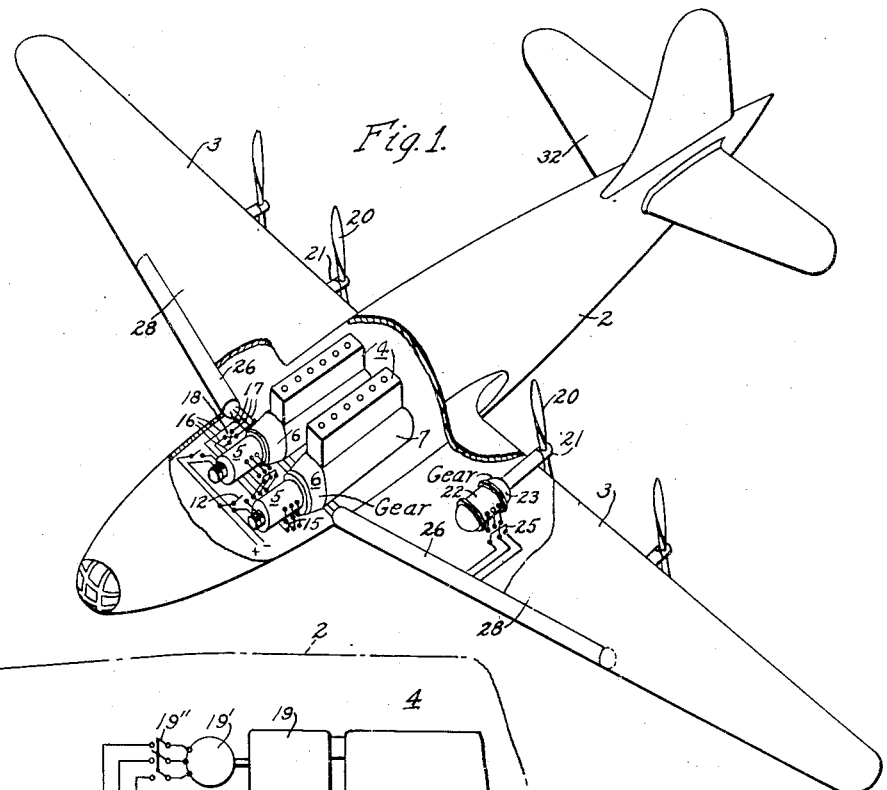
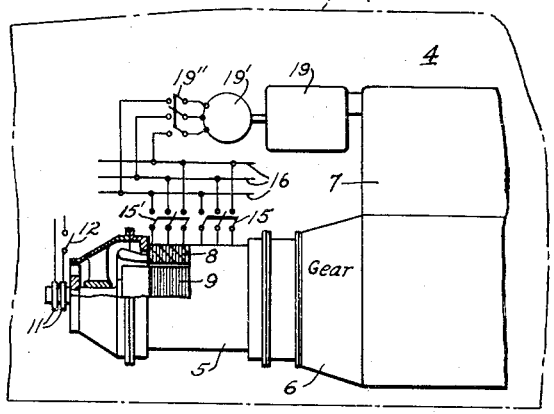
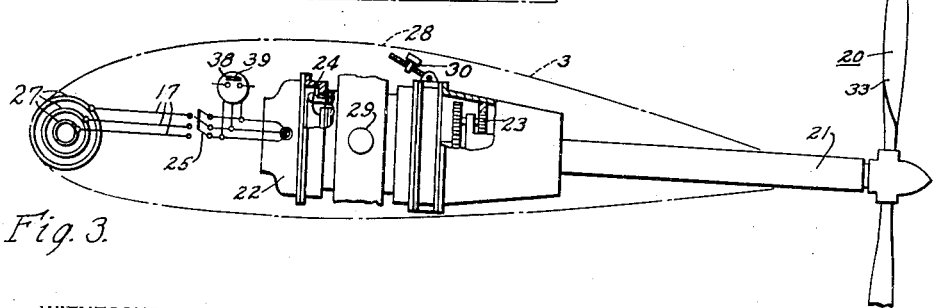
WITNESSES:  
Leon M. Garman
INVENTORS  
Lee A. Kilgore, Frank W. Godsey, Jr.,  
Bennie A. Rose and Frank B. Powers.  
BY O.B. Buchanan  
ATTORNEY

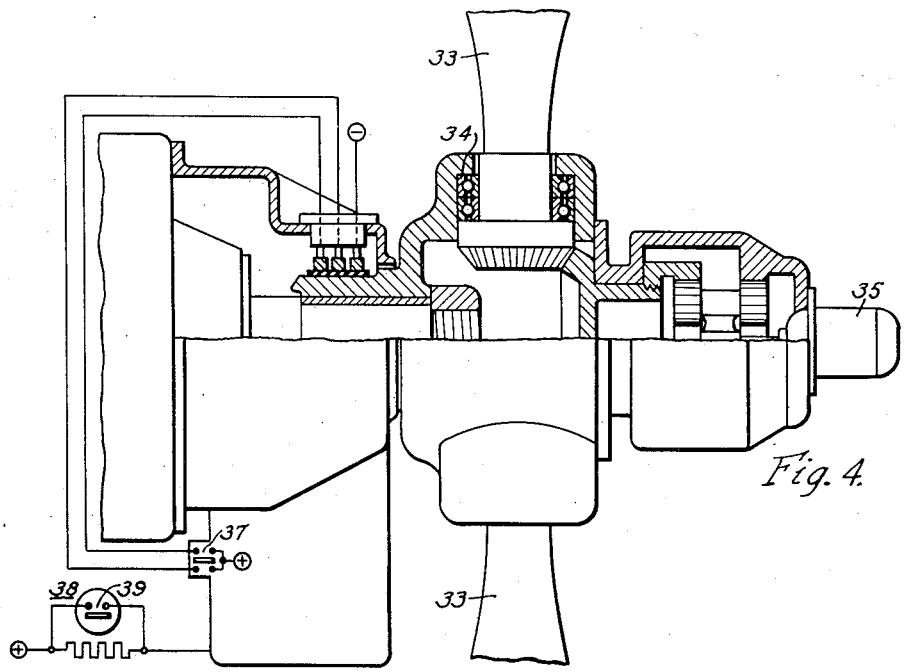
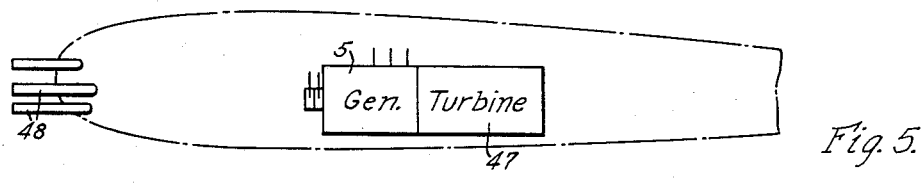
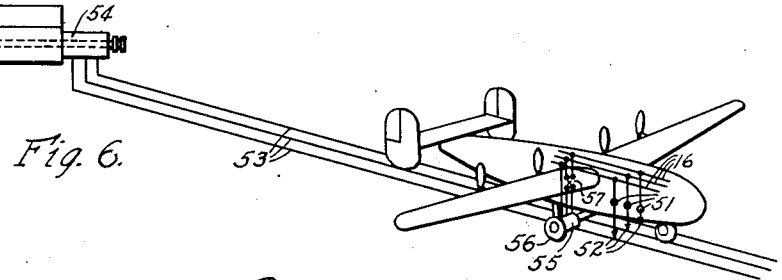
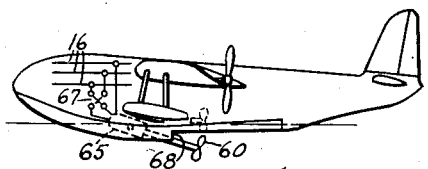

Patented Feb. 22, 1949

2,462,201

UNITED STATES PATENT OFFICE 2,462,201

ELECTRICAL AIRPLANE PROPULSION

Lee A. Kilgore, Forest Hills, Frank W. Godsey, Jr., Wilkinsburg, Bennie A. Rose, Forest Hills, and Frank B. Powers, Pittsburgh 16, Pa., assignors to Westinghouse Electric Corporation, East Pittsburgh, Pa., a corporation of Pennsylvania Application February 2, 1943, Serial No. 474,474

11 Claims. (Cl. 244—60)

Our invention relates primarily to the electrical propulsion of airplanes, and it will be described more particularly with reference to its application to airplanes, although it is to be understood that it is applicable to aircraft in general.

The principal object of our invention is to convert the perennial suggestions of electric power-transmissions in airplanes from the realm of impracticability to the realm of practicability. The most serious obstacle, from the standpoint of practicability of electric airplane-drives, has been a matter of weight per horsepower, which we have succeeded in reducing, to a small fraction of previously achievable weights, by resorting to frequencies of the order of 500 cycles per second, and extremely high speeds of the order of 15,000 revolutions per minute, which are so high that current-collecting commutators, for direct-current machines, are out of the question with the present limits in commutator-design. We also achieve significant weight-reduction per horsepower, by taking advantage of the much lighter weight, per horsepower, of large-sized gasoline engines or turbines, developing more power than can be absorbed in a single propeller, and necessitating some sort of power-transmission from a single large prime mover to a plurality of propeller-shafts. We have produced a design of electrical airplane-propulsion which may actually increase the cruising-radius or the speed of the airplane, while reducing the amount of gasoline required per flight.

We have given first mention to the matter of weights and flight-efficiencies, because the aircraft industry is now placing so much emphasis on these items that, to all intents and purposes, it will not accept an electrical drive, in spite of its manifold other advantages, unless it can compete, in the matter of weights and flight-efficiencies, with direct mechanical drives from the present gasoline engines. In this respect, the aircraft industry is following in the traditional pattern of other industries, such as the steel-mill industry, when electrification was first being introduced. This matter of weight-efficiency is an extremely practical, and an extremely important, consideration, and it constitutes a fundamental requirement, which we have successfully met in our electrical airplane-drive.

We believe, however, that, in the future, when electrical aircraft-drives are established and better appreciated, reasonable weights and flight-efficiencies will be taken as a matter of course, and other considerations will develop into such outstanding significance, that weights and flight-efficiencies will not be given the first emphasis. For example, our electric drive concentrates the main weight of the power-plant near the center of gravity of the airplane, thus avoiding the turning-moment heretofore existing between the center of gravity of the airplane and the mass of each of the propeller-engines. In this manner, we have increased the maneuverability and decreased the control-surface areas which are required for maneuvering the plane.

In our design, we have moved the propeller-driving engines of a multi-propellered plane, from nacelles or wing-fairings or bulges, to the fuselage, and we have replaced them with high-speed, light-weight, small-diameter electric motors and gear-units, which can be submerged entirely within the airfoil section of the wing, for driving the propellers. In this manner, we have eliminated the 20% drag, more or less, which has been previously encountered, either because of a propeller mounted in the nose of the fuselage, or because of the necessity of pushing, through the air, a gasoline engine having many times the required diameter of our motor, and requiring a bulge in the wing-surface at the point where the engine is located, thereby losing the lifting-effect of the wing at this point, besides the disadvantage of having to push such a large engine-bulge through the air at a high speed. In our design, we are enabled to utilize a large number of relatively small-powered propellers, which may be designed with high efficiencies, utilizing preferably small-diameter three-bladed propellers, which can be readily balanced, although we could also advantageously use propellers having only two blades, because the propeller-efficiency goes down by as much as 5% for each additional propeller-blade which is added. By utilizing a large number of relatively small-powered propellers, we are also enabled to keep down the propeller-diameter, which in turn means that the wing which carries the propellers can be kept down to a height closer to the ground or to the water, as the case may be.

By utilizing a centrally located power-plant, we are enabled to take advantage of the important weight-reductions and increased economy of performance which are obtainable with large engines, developing more power than can be absorbed by a single propeller. A 100-horsepower gasoline airplane-engine weighs on the order of 5 pounds per horsepower. As the engine-size increases, the weight per horsepower comes down, and approaches 2 to 1.7 pounds per horsepower in reciprocating gasoline engines of 2000 horsepower and above, with accessories. Still larger engines are now under development in which it may be possible to obtain, in the near future, better than 1 pound per horsepower. Gasoline or gas turbines are also under development, as distinguished from reciprocating engines, giving promise, in the immediate future, of supplying 6000 to 10,000 horsepower at 0.4 pound per horsepower, or less. These amounts of energy are more than can be absorbed by a single propeller, so that it seems to be definitely established that the airplane of the immediate future will be provided with larger engines or turbines in the fuselage, with some form of transmission to a plurality of smaller propellers on the wing or wings. Our electric drive, with its high rotor-speeds and light weight, is of obvious advantage in such a combination, as distinguished from line-shaft drives and hydraulic drives, which have also been considered for driving a plurality of propellers from a single engine.

We consider that an extremely important advantage, or object, obtained by our invention, resides in its extreme simplicity, and in the very considerable reduction in instrumentation and manipulation which is necessary to control the airplane, as compared with an airplane having a separate gasoline engine for each propeller. Present airplane-engines mounted in wings use air-coolers, air-heaters, oil-coolers, oil-heaters and superchargers, plus instrumentation for showing, in the cockpit, or on the navigator's operating-panel, a large number of items for each engine, including its velocity, power, temperature and density of incoming air, temperature of outgoing air, exhaust-gas analyzers, temperature of oil, temperature of gasoline, temperature of each individual cylinder head, and much more. A simple, squirrel-cage electric motor, mounted in the wing, in accordance with our invention, requires none of this instrumentation, thus saving weight, and enormously reducing the complexity of the instrument-panel control for the airplane.

Where more than one propeller-engine is utilized, in planes having a separate engine for each propeller, a very serious problem exists in connection with the necessary synchronization of the engines, which requires the operator, before take-off, and at all times during flight, to carefully synchronize the various engines, by delicate and skillful manipulation of the throttles, so as to avoid the development of beat-frequencies resulting from different propeller speeds which, if permitted, would very seriously vibrate the entire craft. By our electric drive, utilizing motors which operate substantially at synchronous speeds, the simple expedient of utilizing a common supply-bus for all of the propeller-driving motors automatically synchronizes the propellers, and avoids the propeller-synchronizing problem which mounts very rapidly, in proportions, requiring an extreme amount of the operator's attention, as the number of propellers is increased above two.

The use of a plurality of electric motors for driving a plurality of propellers distributed over the wing also reduces stresses and vibration in the wing-structure, which is at best quite flimsy in comparison with its size. The smooth torque of a polyphase motor is in sharp contrast to the pulsatory torque which is obtained from a gasoline engine, such as was formerly used to drive the propellers, and it altogether avoids the possibility of operation with a missing cylinder on a reciprocating-type propeller-driving engine, as sometimes occurred in the past.

The use of squirrel-cage propeller-driving motors, in the wings, altogether avoids contact-making parts which might involve a fire-hazard, and it also avoids the necessity for piping the highly inflammable gasoline throughout the wing-structure, as was formerly necessary in airplanes having wing-mounted propeller-engines.

The use of an electrical power-plant on an airplane makes it possible to utilize superchargers which are driven from electric motors energized from the electric power-plant.

The electric drive also makes it possible to supplement the energy available for take-off, so as to reduce the length of runway which is necessary, by utilizing a separable connection for tying into a stationary power-line or source, for augmenting the power of the craft-borne power-plant, to feed more power into the driving-motors during the few seconds of take-off.

The use of an electric power-plant makes it feasible, also, to utilize auxiliary propelling-means during take-off, to supplement the propelling force of the propellers which rotate in air, which are relatively inefficient thrust-producers when the plane is just starting. Such auxiliary propelling-means may be in the form of a water-propeller for a seaplane, with an electric-motor drive energized from the power-plant, or it may take the form of traction-motors added to the wheels of the landing gear of land-based aircraft. In the latter case, the motors on the landing wheels may be utilized to bring the landing wheels up to speed before landing, thereby making a possible hundred-fold increase in the life of the rubber tires. The use of electrical drive equipment also makes possible the easy reversal of the driving motors for braking purposes, either before or after landing, or both.

Electrical airplane-propulsion has another very important advantage which is only just beginning to be generally appreciated, and that is, its adaptability for being used as a speed-changing device, by utilizing multiple-pole-number, or variable-speed, generators or motors, or both. Because take-off power is the limiting feature in the design of airplane-engines or prime movers, they must be operated, during take-off, at the speed which gives the maximum horsepower output, but this speed and power-output is so high that the engine may be operated for only a short time, such as five minutes, at this speed of maximum horsepower. On the other hand, the maximum efficiency of the engine occurs at a much lower speed, such as one-half, or other fraction, of the speed of maximum power, and obviously, for cruising, the airplane-engine should be operated at its speed of maximum efficiency, or lowest gas-consumption per horsepower or per mile of flight. The propeller, however, operates most efficiently when its peripheral velocity is just below the velocity of sound, after which its efficiency falls off rather rapidly, so that it cannot be operated at a tip peripheral velocity higher than the velocity of sound, even for take-off. This means that, when the engine-speed is reduced to half-value, or some other fraction, for cruising, the propeller-speed will be reduced to a less efficient speed, unless means can be provided for varying the ratio between engine-speed and propeller-speed. To build a gear-shifting or variable-speed gear-unit in sizes of the order of from 1,000 to 5,000 horsepower presents quite a difficult design-problem, and involves considerable weight, and yet, it is being seriously considered, in non-electrical airplane-drives, because of the importance of keeping up the propeller-speed during cruising. With our electrical drive, no gear-shifting or speed-changing gear-manipulations are necessary, because variable-pole-number generators or motors may be used. Thus, the generators may be connected for two-pole operation during take-off, and reconnected for four-pole operation during cruising, with the motors operating at four poles in both cases, so that the propellers may be operated at the same speed for take-off and cruising, while the engine-speed is cut one-half for cruising.

Electric drive equipment for aircraft has numerous other advantages, which are too numerous even for enumeration, including the use of the same power-plant to energize or operate motorized retracting-gears for the landing equipment, bomb-bay doors in the case of military airplanes, mooring and anchor winches in the case of seaplanes, operating-motors for actually controlling the control-surfaces of large airplanes where the pilot's strength is not sufficient to handle the large mechanical forces required, lights, heat, de-icers, radio reception, radio transmissions, radio-beam following, landing-beam following, and many other uses which will develop as the size, speed, and altitude at which flight takes place increases.

In multi-motored planes, the electric drive is of considerable practical value in being interchangeable without special adjustment, thus saving spare parts and installation-time at bases. Since the propellers must operate, some in one direction, and some in the other, to balance out the torque-reaction in the airplane structure, the prime-movers must operate in different directions. When engines are used for the prime-movers, the engines are not strictly interchangeable, because opposite rotation requires different valve-setting, gearing, and the like. Since electric motors operate equally well in either direction, this trouble is avoided.

The use of a concentrated power-plant apparatus, and a distributed propulsion apparatus, or the other way around, the one being mounted in the fuselage near the center of gravity, and the other being distributed at a plurality of points throughout the wing-structure, removes countless design-limitations which now handicap the aircraft designer, making it a very simple matter to shift the distributed motors or other units, both in a fore and aft direction, and sideways, in order to achieve the best weight-balance for the plane.

All of these advantages of our electrical airplane-drive, and other advantages too numerous to mention in a limited treatise, would not be available, if we had not been able to provide electrical equipment which is many times lighter, in weight, than anything heretofore produced in comparable large-power electrical equipment. Electric motors and generators for industrial purposes have each weighed roughly 20 pounds per horsepower over a period of a good many years. In electric traction, for street-cars, buses and electric locomotives, where weight is at a premium, the lightest-weight motors have weighed about 8 pounds per horsepower. In electric ship-propulsion, the combined weight of motors and generators, for the best ship-drives, has been brought down to a total of about 7 pounds per horsepower, in units as large as 4000 horsepower. In our present design of high-speed, high-frequency, light-weight motors and generators for aircraft-propulsion, we have succeeded in producing a design resulting in 0.4 pound per horsepower for the 1000 horsepower motors, and 0.3 pound per horsepower for the 2000 horsepower generators, to which will have to be added something like 0.1 pound per horsepower for the gears, and from 0.05 to 0.1 pound per horsepower for the electric buses and cables.

We have accomplished this very significant weight-reduction of the electrical equipment by resorting to extremely high speeds, which means frequencies higher than commercial frequencies, and also by making use of the best available materials and design-features. We have designed the rotating members of our electrical machines so as to have a peripheral speed approaching as nearly as possible to the speed of sound, which must not be exceeded if we are to have efficient heat-removal by blowing air over the rotating surface. At these high peripheral speeds, it is essential that the weight of the rotor members be reduced to an absolute minimum, by resorting to such expedients as the use of special light-weight conductors, such as aluminum or magnesium or hollow conductors, special magnetizable material which can be worked very hard, special light-weight slot-wedges for resisting the high centrifugal forces, special inorganic insulating-materials, such as the newly developed silicones, which will allow the operating temperatures to be raised to the order of 200° C. in order to bring the weight down, special high-alloy steels having ability to withstand the high speeds of operation, special axial ventilation for causing the air to flow in generally axial directions at extremely high velocities, with a minimum of bending or deflecting or turnings in the air-stream, streamlined surfaces over which the ventilating-air flows, and many other expedients.

Since the horsepower-rating of a given electrical machine varies substantially directly in proportion to its speed, the very great importance of a high speed of operation of the electric motors and generators will readily be apparent. We believe that top-speeds below 10,000 revolutions per minute will not in general be acceptable, at least during the early stages of the electrification of aircraft-propulsion, when so much attention is being given to the matter of weight, because the weights of the electrical machines are beginning to go up rather rapidly as the speed is reduced below 10,000 revolutions per minute, and hence the weight-efficiency is lost. We believe that, at present, 20,000 revolutions per minute is an approximate upper limit of the useful maximum speed-range of the electrical machines, both because of the limitations of bearings, the strength-limitations of available materials, and the increasing cost of the speed-changing gearing which begin to nullify the advantages of any increase in generator or motor speed much above 20,000 revolutions per minute. Speed-changing gearing is necessary, because the propellers, for example, operate best at speeds of the order of 1200 to 2000 revolutions per minute, and many types of reciprocating engines operate best at speeds of the order of 2000 to 3000 revolutions per minute, although some of the newer turbines which are being developed may operate at speeds in the same range as our electrical generators, resulting in a very advantageous direct-drive connection between the generators and the turbines.

Because of our high speed of operation, we have ruled out direct-current machines, because present-day commutators cannot be operated at anything approaching the machine-speeds which we utilize. Alternating-current machines are, therefore, a requisite. The electrical machines should preferably have four poles for continuous operation, as in cruising, although six or eight poles are a possibility, and may be desired in some instances, particularly where it is desired to have the motors and generators operate at different speeds. Two-pole machines are disadvantageous because of the length of end-windings which are required, and which, of course, are not producing torque. More than four poles decreases the speed or increases the frequency and, therefore, affects the weight-efficiency from that stand-point. We thus prefer a polyphase electrical system operating at a top-frequency in the range between 300 and 700 cycles per second.

In many cases, our invention is most advantageously utilized on an airplane having variable-pitch propellers, in which the pitch of the propeller-blades may be changed to a slightly steeper angle when large amounts of thrust are required, thereby reducing the speed-range at which it is necessary to operate the driving-motor. These variable-pitch propellers may be operated either by manual adjustment or by automatic speed-responsive adjustment, so as to cause the propellers to operate at a more or less constant speed, which may vary, for instance, by not more than 30% throughout the entire range of normal operating conditions. When our electrical drive is utilized with such a so-called constant-speed propeller, the propeller or propellers thus determine the speed and frequency of the electrical generator. We may also utilize wattmeters or other electroresponsive devices, responsive to some electrical quantity of the power-input into the several propeller-driving motors, for effecting slight pitch-adjustments which cause each propeller to take its proper proportionate part of the load.

With the foregoing and other objects in view, our invention consists in the apparatus, parts, combinations, systems, and methods hereinafter described and claimed, and illustrated in the accompanying drawing wherein:

Figure 1 is a perspective view of an airplane with parts broken away to show an electric propulsion-equipment in accordance with our invention, some of the electrical connections being indicated diagrammatically;

Fig. 2 is a side elevational view, partly in longitudinal section, of one of the power-plant units consisting of a generator, a gear, and a reciprocating gasoline engine in the fuselage, with a diagrammatic representation of a supercharger driven by an electric motor which is energized from the generator-bus;

Fig. 3 is a somewhat diagrammatic transverse sectional view through a wing, showing a vertical elevational view, partly in section, of a tiltable propeller-shaft unit, driven by an electric motor through a reduction gear, with a diagrammatic representation of pitch-varying means for varying the pitch of the propeller blades;

Fig. 4 is a detail view of a part of the variable-pitch propeller and some of its control;

Fig. 5 is a view similar to Fig. 2, but showing a direct turbine-drive for the generator, and showing the application of the invention to a military aircraft in which the mass of the power-plant is used to absorb recoil from guns mounted in the nose of the fuselage;

Fig. 6 is a diagrammatic perspective view of an airplane on its take-off runway, with detachable-connection-means to an electric supply-line or source on the ground, for supplying additional take-off power, and also diagrammatically illustrating the use of traction-motors on the wheels of the landing gear for assisting in take-off; and Fig. 7 is a diagrammatic side elevational view of a seaplane having a motor-driven water-propeller for assisting in take-off.

In Figure 1, we have illustrated our invention as applied to the electrical propulsion of an airplane of a type having a fuselage 2 and a wing or wings 3. We have provided a centrally located electrical power-plant 4 which is disposed at or near the center of gravity of the plane, in the fuselage 2. This power-plant comprises one or a small number of polyphase synchronous generators 5, each driven by a suitable driving-means, the driving means being illustrated, in Figs. 1 and 2, as comprising a step-up speed-changing gear-unit 6 and a reciprocating gasoline engine 7.

Each of the electrical generators 5, as shown more in detail in Fig. 2, comprises a stationary three-phase (or other polyphase) armature-member 8, surrounding a rotating field-member 9, which is excited with direct current supplied to slip-rings 11 through a suitable field-switch 12.

It is a characteristic feature of our invention that the generator or generators 5 are driven at quite a high speed, so that they have a top-speed in the range from about 10,000 to about 20,000 revolutions per minute, preferably somewhere around 15,000 revolutions per minute. As previously explained, these generators are preferably four-pole generators, although they may have either six or eight poles, or the generators may be connected for either two or four poles, or for either four or six, or six or eight, or other pole-combinations. These generators are designed with a maximum use of light-weight metals, such as aluminum or magnesium, for all parts except those which must necessarily be provided for carrying magnetic flux or carrying high mechanical strains. In addition, high-temperature insulating-materials are utilized, high-velocity axial-flow ventilation is provided, and in general the design is pushed beyond conventional limits in all respects contributing toward obtaining the maximum power-output from the smallest and lightest possible generator. Our novel design has enabled us to achieve a 1600 kva. rating in a generator having an overall radius of 15 inches, weighing approximately 600 pounds.

The gear-unit 6 of the power-plant 4 is preferably of the planetary type, allowing very large speed-ratios of the order of from 10 to 1 to 15 to 1 to be used. The particular power-plant illustrated in Figs. 1 and 2 utilizes a step-up gear-unit having a ratio of 7½ to 1, interposed between a 2000 revolutions per minute engine 7 and a 15,000 revolutions per minute generator 5.

While a single generator 5 may be utilized, it is usually desirable, on any aircraft utilizing two or more propellers, to provide more than one generating-unit, for reasons of safety, although, in general, the number of generating-units will be kept down to a small number, so that full advantage may be taken of the weight-reductions which are obtainable in the larger-sized units, both in the generator and in the engine or other driving-means.

Two generators 5 are shown, by way of illustration, in Fig. 1, these generators being connected, through switches 15, to a common three-phase generator-bus 16, to which various auxiliaries may be connected. As shown in Fig. 2, each generator 5 is a two-pole-number generator, having, for example, four-pole winding-connections or terminals which can be connected to the bus 16 through a switch 15 for cruising, and two-pole winding-connections or terminals which can be connected to the bus 16 through another switch 15' for take-off, so that the generator-bus 16 may be energized from either the four-pole winding-connections or the two-pole winding-connections. As previously explained, the engine-speed, and hence the generator-speed, will be reduced to half, or other fraction after take-off, and hence, by opening the take-off switch 15', and closing the cruising-switch 15, the bus-frequency may be maintained substantially constant, notwithstanding the change in the engine-speed. It will be understood, of course, that other pole-number combinations could be utilized. While a two-pole generator is less efficient than a four-pole generator, because of the longer end-connections, yet this reduced generator-efficiency may be accepted, during the brief period of take-off, for the good of the efficiencies of the engines and propellers.

The generator-bus 16 is shown as being connected to a common motor-bus 17 through a phase-sequence-changing switch 18. Among the largest of the auxiliaries which may be energized from the generator-bus may be mentioned a supercharger 19 (Fig. 2), driven by an electric motor 19' which may be either single-speed or multiple-speed, and which may be connected to the bus 16 through a switch 19''.

The airplane which is shown in Fig. 1 is provided with suitable propulsion-apparatus, which is shown, by way of illustration, as comprising four propellers 20 which are disposed at different points in the wing-structure 3. As shown in Figs. 1 and 3, each propeller 20 is mounted on a propeller-shaft 21 which is driven from a driving-unit comprising a motor 22 and a gear-unit 23. The motor 22 is of a design similar to the generator 5, except that it is usually smaller, because it has a smaller rating. Preferably also, the motor 22 is a squirrel-cage motor, rather than a synchronous machine. In any event, the motor 22 should be a poly-phase motor operating at substantially synchronous speed, that is, either at precisely synchronous speed, as in a synchronous motor, or at a very small slip with respect to synchronous speed, as in a motor having a low-resistance squirrel-cage winding. The low-resistance squirrel-cage rotor-member of the motor 22 is indicated at 24 in Fig. 3.

As shown in Fig. 1, the four propeller-driving motors 22 are all energized, through individual switches 25, from the three-phase motor-bus 17. In Fig. 1, we also illustrate an important use for the motor-bus 17 in being merged into a three-phase cable 26, which may be composed of three concentric aluminum pipes 27 as shown in Fig. 3, and which is made to serve as the leading edge of the wing or wings 3, or at least the leading edge of a portion of the wing-structure, so that the heat generated in the cable 26 may be utilized for preventing ice-formation on the wing or wings.

The propeller-driving motors 22 may be of the single-pole-number type, such as four-pole motors, while the generators 5 may be either single-pole-number generators, such as four-pole generators, or multiple-pole-number generators as previously described. On the other hand, the motors 22 may be variable-pole-number machines, while the generators are single-pole-number machines, or both motors and generators may be variable-pole-number machines, for conveniently obtaining the desirable variation in the speed-ratio between the engine-speed and the propeller-speed, so as to permit the engine to operate at a high speed for take-off, and at a lower speed for cruising, while the propeller operates at a substantially constant speed under both conditions, without any great speed-change between take-off and cruising conditions.

As shown in Fig. 3, our electric motor-drive for each of the several propellers 20 is an extremely compact unit, which can be easily submerged within the air foil surfaces 28 of the wing 3 within which the propeller-driving unit is placed, the motor 22 being so small in diameter that it may be placed at almost any point within the air-foil section of the wing, even at the tapered small end of the wing. The motor-and-gear structure 22 and 23 can even be utilized as a part of the stiffening-means of the wing-section, but in Fig. 3 we have illustrated another important advantage of the electric motor-drive for the several propellers, in that each drive-unit is so small and so simple that it is easy to provide a tiltable propeller-shaft 21, which may be tilted in a vertical plane by means of a gimbal mounting 29 and a suitable propeller-tilting mechanism 30.

It is an advantage of our electrical drive-equipment that the propellers 20 may be of either the pusher type or the tractor type. In Figs. 1 and 3, we have illustrated propellers of the pusher type, which have advantages in that the whirling slip-stream back of the propeller is not caused to flow over the airfoil surfaces 28 of the wings, to the detriment of the lifting-efficiency.

Our electrical propulsion-equipment also makes it possible to locate the several propellers 20, each with its own driving-motor 22, at the most advantageous positions, with respect to many different considerations. For example, the design may easily be made such that one or more of the propellers 20 is in front of the tail 32 of the plane, so that the air-blast from that propeller or propellers may blow upon the steering rudders of the plane, making it possible to easily steer the plane even when the plane is moving on the ground at low speeds.

As shown in Fig. 3 and 4, the propellers 20 are preferably of the adjustable-pitch variety. Each of the propeller-blades 33 is mounted for rotational adjustment through bearings in the hub as shown at 34, so as to change the pitch of the propeller under the control of a pitch-control motor 35. The pitch-control motor can be either electric or hydraulic, and it can be either manually or automatically controlled, as is well understood in the art. If automatically controlled, it is usually controlled in response to the speed of the propeller, by means of a speed-responsive contact 37 which energizes the pitch-controlling motor 35 in such direction as to effect an increase in the steepness of the pitch when the speed increases, thus preventing excessive racing of either the propeller or the prime mover when large amounts of power are required.

In accordance with our invention, where electric drive-motors 22 are provided for the several propellers 20, the automatic pitch-control may conveniently include a load-responsive means for causing the several propellers to properly divide the load between themselves. This load-division control may take the form of a wattmeter relay 38 which responds to the electrical power-input, or other electrical quantity of the power-input into each individual propeller-driving motor 22. Thus the power-input relay 38 has contacts 39 for controlling the pitch-control motor 35 in such direction as to make relatively slight reductions in the pitch of the propeller-blades 33 when the electrical power-input increases, so as to tend to prevent any propeller from taking more than its proportionate share of the total load. This control-means responding to the electrical power-inputs of the several propeller-motors 22 is intended to be symbolic of any suitable electrical control-means for so adjusting the propeller-pitches as to make the electrical power-inputs into all of the propeller-driving motors equal, if the propellers are all alike, or proportionate in any appropriate predetermined manner, if some of the propellers are different from others.

The operation of our electrical propulsion-equipment will be clear from our original statement of objects, and from the detailed description which as just been given. To point out or summarize some of the salient features of the operation, it may be mentioned that the high speed of operation of both the generators 5 and the propeller-driving motors 22 is essential to their lightness in weight. This high speed of operation in turn entails the use of alternating-current electric energy instead of direct-current energy, and it also entails a high frequency, as the pole-number of either the generators or the motors cannot be reduced below two poles, and for economical light-weight design the pole-number cannot ordinarily be reduced below four poles, in order to avoid the uneconomically long end-connections which are entailed by a two-pole design.

We preferably utilize a four-pole construction for both the generators and the motors, so that the motors will run at the same speed as the generators, except for a small slip in case the motors are induction-motors rather than synchronous motors. As explained before, however, we may, where the weight-requirements are not too stringent, resort to six-pole machines, for either the motors or the generators, or even machines having eight poles, and conceivably more than eight poles, in cases where it is desired to have the motors run at a significantly different speed than the generators.

In order to have our motors and generators as light as possible, it is necessary, not only to have them operate at a speed as high as possible, within the limits of bearing-life, strength of materials, and keeping below the speed of sound for the peripheral speeds of the rotors of the machines, but it is also necessary to resort to unconventional and costly designs, utilizing special light-weight materials, such as aluminum or magnesium, wherever possible, confining the use of magnetizable materials strictly to just the parts which are required to carry flux, and utilizing the very best magnetizable materials for these parts, and utilizing high-strength steel only for the parts which are required to carry the mechanical strains, and utilizing the very best high-strength steels for this purpose. The light-weight design also entails a very unusually large amount of extremely forced ventilation, and the very best high-temperature insulating-materials, which will permit the machines to be operated at temperatures which are considerably higher than the highest conventional temperatures.

The use of these high-speed generators and motors always entails the use of speed-reduction gearing between the motors and their respective propellers, because it is necessary for the diameter of the propellers to be considerably larger than the small diameter of the motors, while still keeping the peripheral velocity of the propeller-blades within the velocity of sound in air of the density or rarity in which the blades are to operate, thus requiring a speed-reduction gearing approximately in the ratio which exists between the diameter of the motor-rotor and the diameter of the propeller-blades. Gear-ratios between 5-to-1 and 15-to-1 are preferred.

In the case of the generators 5, the high speed of the generators will also entail the use of step-up speed-changing gears, at least when reciprocating engines 7 are utilized, as these engines, because of their large size or large diameters, cannot be built to operate at speeds anywhere near approaching our preferred generator-speeds.

As shown in Fig. 5, it is possible, however, to utilize a gas or steam turbine 47 for the prime-mover, which would be of approximately the same size as the electrical generator 5, being limited by similar considerations with respect to its rotor-diameter. Such a turbine has a high operating-speed, making possible a direct drive-connection between each turbine 47 and its generator 5, without the interposition of speed-changing gearing. Our electrical drive-system, therefore, is particularly well adapted for the use of gasoline-powered turbines 47, or other turbines utilizing some other medium equivalent to gasoline in the sense of a means for storing energy in large quantities, and using it as desired and required. As previously indicated, turbines are particularly advantageous because of their extremely light weight per horsepower, as compared with reciprocating gasoline engines, but they are handicapped, for airplane use, in developing more power, per turbine, than can be absorbed by a single propeller, thus making it desirable to provide some means for driving a plurality of propellers from each turbine, which is a thing for which our electrical drive is particularly well adapted.

Our use of a common motor-bus 17, and a plurality of propeller-driving motors 22 which all operate at or close to synchronous speed, constitutes a multi-propeller drive-means which automatically synchronizes both the propellers and the prime-movers, so as to avoid any possibility of beat-frequency vibration of the airplane, thus removing, at one stroke, a serious disadvantage of multi-propellered airplanes, making it unnecessary to utilize a large amount of synchronizing equipment which has heretofore been necessary, and also making it possible to greatly increase the number of propellers above the number which has heretofore been practical. Thus, in multi-propellered airplanes utilizing a separate propeller-driving engine for each propeller, the number of propellers has had to be kept as low as possible, not only because the synchronizing difficulties mounted very fast as the number of propellers increased, but also because the weight-efficiency of the propeller-driving engines decreased very rapidly as the sizes of the engines were reduced, as would be necessary if the same total power were to be obtained from a larger number of propeller-driving engines.

An important advantage of our relatively large number of propellers is that they may be distributed throughout the wing-structure in such manner as to stress the wings in the most advantageous manner possible, as well as affecting weight-adjustments, both fore and aft and from side-to-side, in the initial layout of the design of the airplane. The use of a large number of relatively low-powered propellers, rather than a smaller number of relatively large-powered propellers, makes it possible, also, to utilize propellers having a small number of blades, such as two or three blades, preferably two-bladed propellers which are the most efficient propellers available; and it also makes possible the use of propellers having a relatively small diameter, which means that the wing-structure which carries the propellers may be placed close to the ground or to the water during take-off, thus avoiding the necessity for a plane which stands undesirably high, either on the ground or on water, as the case may be.

The use of a centrally located power-plant, where much of the weight of the propulsion-equipment is concentrated, and a plurality of smaller motoring-units which are distributed out on various parts of the wing-structure, is also extremely desirable in an airplane. Heretofore, the weights of the propeller-driving engines, in a multi-propellered plane, have necessarily been disposed away from the center of gravity of the plane, where they exercise turning-moments or couples with respect to the center of gravity of the plane, making it difficult to maneuver the plane, or to change its direction of travel. Furthermore, the disposal of the heavy weights of the engines in the wing-structure has interposed a heavy concentrated burden on the wing-structure, which must necessarily be made as light as possible, with a reasonable factor of safety, in order to keep down the non-paying weight of the plane. Our multi-motored construction avoids this disadvantage by making it possible for the designer to distribute the stresses more evenly about the wing-structure, and in some cases, as in landing, to very materially reduce the wing-stresses by taking the major portion of the weight out of the wings and placing it in the fuselage near the center of gravity.

In military aircraft, as shown in Fig. 5, the disposal of the engines and generators at or near the center of gravity of the plane makes it possible to utilize the mass of this power-plant as a direct back-up means for absorbing the recoil of forward guns 48 mounted in the nose of the fuselage, thus making it possible for the recoil of the guns to be absorbed in a straight line back to the mass of the power-plant, instead of having to be transmitted through the wing-structure to laterally disposed propeller-driving engines, as in previous multi-propellered military planes.

Our invention is particularly well adapted for use on planes utilizing so-called constant-speed propellers, which are variable-pitch propellers having automatic speed-responsive means, for increasing the blade-pitch when an attempt is made to drive the propellers at higher speeds. When our electrical propulsion-equipment is applied to such an airplane, no speed-governor is required on the power-plant, except a back-up governor (not shown) for shutting the plant down in case of an emergency. In normal operation, the so-called constant-speed control-means for the individual propellers determine the speed of the prime-movers, and no other speed-control is necessary. The term "constant-speed" is here used in an extremely loose sense, contemplating possibly a take-off speed or maximum-power speed which may be 30% higher, more or less, than the normal cruising-speed of the equipment. It is really preferable, however, for the propeller-speed to be held to a much more constant value, with very little permissible variation in speed, and to obtain the necessary speed-variation in the engine, as between take-off and cruising conditions, by electrical pole-number control, as previously explained.

Not the least, in importance, in the consideration of the operation and advantages of our invention, is the reduction which we have been able to make in the diameter of our propeller-driving means. Thus, in present-day air-cooled 1000-horsepower airplane-engines, a diameter of approximately 50 inches is used for reasons of directing cooling air through the cylinders, which are located radially around the crankshaft. In liquid-cooled airplane engines of the same rating, the cylinders may be arranged in a fore and aft direction, so that the diameter of the engine may be roughly 3 feet. This means that a circle of approximately 3 feet in diameter, in the case of a liquid-cooled engine, or over 4 feet in diameter, in the case of an air-cooled engine, must be driven through the air with the airplane, for each propeller, resulting in a high drag, which would not be necessary from an aerodynamics standpoint if it were not necessary to have such a large engine for driving the propeller. The perfect airplane would have all of its surfaces an airfoil, providing lift, and producing only such drag as would be required by the drag of a perfect airfoil. In our invention, by providing a 1000-horsepower electric motor and gear unit combination having a diameter of less than 15 inches, we provide a propeller-drive unit which is so small that it can be submerged in the airfoil-section of the wing, and which introduces no drag whatever. In this manner, we are enabled to reduce the force necessary to drive the airplane through the air by as much as 20%, more or less, thus saving considerably in the amount of gasoline which has to be carried per flight.

Our use of squirrel-cage induction-motors, for driving the propellers, also enormously simplifies the connections between the fuselage and the propeller-driving means. All that we require is a three-conductor cable leading to the motors. There are no moving contacts of any kind, and no possibility of producing sparks. There are no indicators, or only the barest minimum of indicators is necessary to be carried back to the fuselage for showing up on the pilot's operating-panel. This is in very sharp contrast with the wing-mounted gasoline engine, which requires large quantities of highly inflammable gasoline to be piped over the flimsy wing-structure, besides a very large amount of instrumentation which is necessary to be provided in order for the pilot to properly supervise the engine-operation, as previously pointed out.

Because of the multiplicity of controls which are necessitated by a gasoline engine for driving the propellers, it has not been easily possible to mount such engine-driven propellers so that the angle of the propeller axis, with respect to the longitudinal axis of the airplane, could be changed at will, in order to improve the lift for take-off, or for other purposes. With our motor-driven propellers, with only three wires going to the motors, and no other control, it is a very simple matter to mount the motor and propeller shaft in bearings, as indicated at 29, so that this angle of the propeller may be adjusted.

Many other advantages, too numerous even to enumerate, are obtained by our electrical drive for airplanes. In Fig. 6, for example, we show how it is feasible, with our electric drive, to provide additional amounts of power for take-off, thus reducing the length of the runways, which are becoming very excessive for the larger types of planes, and also making it possible for the plane to take off with high loads. It is well known that most of the power of the prime-movers which are provided on a plane must be utilized in the take-off. Once the plane is in the air, a relatively small amount of power will suffice to sustain it in flight and to maintain the required velocity. Airplane engines are, therefore, commonly rated on a 5-minute basis, which means that the engine can operate under its maximum power for 5 minutes, and if pushed much further, can be expected to fly to pieces or otherwise fail. With increased take-off power, the take-off time can be reduced to less than a minute or even to a matter of eight or ten seconds, more or less.

In accordance with our invention, therefore, as shown in Fig. 6, we prefer to provide detachable electrical conductor-means, which may be in the form of a separable plug-attachment 51, in connection with the generator-bus 16, whereby a third-rail connection 52 may be utilized to temporarily increase the operating-power during take-off. The third rails 53 are energized from any suitable three-phase electric power line on the ground, as symbolized by a stationary electric power-plant 54. This stationary electric power-plant may generate three-phase power either at the same frequency as the normal top-frequency of the plane-borne generating-plant 4, in which case the increased thrust for take-off would be provided by increasing the pitch of the propeller-blades, or the stationary power-plant may operate at a slightly higher speed, so as to temporarily increase the speed of the plane-borne power-plant and propeller-driving motors, or both expedients might be utilized. Our motors 22 may safely be greatly overloaded for the few seconds of take-off.

Our electrical propulsion-equipment also makes it extremely feasible to augment the take-off thrust which is obtainable from the propellers, by some kind of propulsion-means which reacts otherwise than through a rotating propeller in air. This is particularly desirable, not only because of the demands for an abnormally high accelerating-thrust for take-off purposes, in order to get the plane into the air, but also because of the fact that the rotating propeller operating in air is a rather inefficient means for providing thrust when the plane is not in motion.

In the case of land-based planes, as shown in Fig. 6, this additional take-off thrust may be provided by means of driving-motors 55 on the wheels 56 of the landing-gear. These wheel-driving motors 55 may be connected to the generator-bus 16 through a reversing switch 57, whereby these wheel-motors may be energized for producing additional take-off power during the take-off perod. Also when the plane is about to make a landing, these wheel-driving motors 55 may be energized to rotate the wheels 56 to the approximately correct speed, so as to avoid the necessity for skidding the rubber tires of the wheels along the landing field when the tires are subjected to the initial shock of landing, thus increasing the tire-life from a relatively limited number of landings to an almost indefinite life.

Furthermore, by reversing the wheel-driving motors 55, immediately after landing, any desired amount of braking can be obtained for reducing the distance which the plane has to run on the landing field before coming to a stop. This braking ability of our electric propulsion-equipment is also applicable, of course, while the plane is in flight, in the air, before effecting a landing, because of the possibility of reversing the propeller-driving motors 22 by manipulating the phase-sequence-reversing switch 18, which is connected between the generator-bus 16 and the motor-bus 17 which energizes the propeller-driving motors 22. It may be desirable, in some cases, to first open the field-switch 12, or to otherwise kill or reduce the generator-field, and hence the generator-voltage, before a switching-operation such as the reversing-switch operation just described, thereby greatly reducing the burden on the armature-circuit switches or circuit-breakers 13, and also reducing the shock of reversal by building up the generator-flux again, after the motors have been reversed.

In the case of a seaplane, as shown in Fig. 7, the additional thrust for rapid take-off may be obtained by means of a retractable water-propeller 60 which may be let down into the water, and be driven by an electric motor 65 which is connected to the generator-bus 16 through a reversing-switch 67, similar to the motor 55 and reversing-switch 57 previously described for the land based plane in Fig. 6. The motor 65, driving the hydraulic screw 60, will make available a very large amount of thrust for rapid take-off, especially for assistance in getting the seaplane-hull up on the step 68 prior to actual take-off.

While we have described our invention in a preferred form of embodiment which we prefer in the present state of the art, and while we have described certain of its more important design-principles and operation in accordance with our best present understanding of the problem, we wish it to be understood that our description and drawings are merely illustrative, at least in connection with the broader aspects of our invention. We desire, therefore, that our appended claims shall be accorded the broadest construction consistent with their language.

We claim as our invention:

1. A power plant for driving a plurality of rotating propulsion-propellers for producing a propelling-force in air, said power plant comprising one or a small number of polyphase synchronous generators and driving-means therefor, said generator or generators having a speed in the range from about 10,000 to about 20,000 revolutions per minute and having a pole-number in the range between 4 and 8, inclusive, a plurality of propeller-driving polyphase motors, each located close to an associated propeller-shaft, each motor having more than two poles, and each motor operating at a substantially synchronous speed, for driving a plurality of said propeller-shafts, said generators and motors being of a light-weight construction, each weighing a fraction of a pound per horsepower, there being a larger number of motors than generators, the energization of the larger number of substantially synchronous motors from the smaller number of generators being such as to automatically achieve such substantial synchronization of different-positioned propellers as to substantially prevent propeller-synchronization difficulties, and electrical control-means and connections for controllably energizing said propeller-driving motors from said generator or generators.

2. The invention as defined in claim 1, characterized by the propeller-driving motors being four-pole squirrel-cage motors, and the mechanical driving connection between each motor and its propeller-shaft including a speed-reducing gear-unit having a speed-ratio in the order of from about 5 to 1 to about 15 to 1.

3. A power plant for driving a plurality of rotating propulsion-propellers for producing a propelling-force in air, said power plant comprising one or a small number of polyphase synchronous generators and driving-means therefor, said generator or generators having a top-frequency between 300 and 700 cycles per second, a plurality of propeller-driving polyphase motors, located close to their respective propeller-shafts and operating at substantially synchronous speeds for driving a plurality of said propeller-shafts, said generators and motors being of a light-weight construction, each weighing a fraction of a pound per horsepower, there being a larger number of motors than generators, and a common polyphase supply-bus, energized from said generator or generators, for energizing all of said plurality of propeller-driving motors.

4. The invention as defined in claim 3, in combination with means for at times reversing the phase-sequence of the energizing-connections between the generator or generators and said common polyphase supply-bus.

5. A power plant for driving a plurality of rotating propulsion-propellers for producing a propelling-force in air, said power plant comprising one or a small number of polyphase synchronous generators and driving-means therefor, said generator or generators having a top-frequency between 300 and 700 cycles per second, a plurality of propeller-driving polyphase motors, located close to their respective propeller-shafts and operating at substantially synchronous speeds for driving a plurality of said propeller-shafts, said generators and motors being of a light-weight construction, each weighing a fraction of a pound per horsepower, there being a larger number of motors than generators, means for at times materially reducing the field-flux excitation of a generator or generators, the energization of the larger number of substantially synchronous motors from the smaller number of generators being such as to automatically achieve such substantial synchronization of different-positioned propellers as to substantially prevent propeller-synchronization difficulties, and switching-means for controllably energizing the propeller-driving motors from said generator or generators.

6. Electrical propulsion-equipment for a multi-propellered aircraft, comprising one or a small number of four-pole three-phase synchronous generators of a frequency between 300 and 700 cycles per second, and driving-means therefor, a plurality of four-pole three-phase squirrel-cage propeller-driving induction-motors, located close to their respective propeller-shafts, in combination with speed-reducing gear-units for driving a plurality of said propeller-shafts, said generators and motors being of a light-weight construction, each weighing a fraction of a pound per horsepower, there being a larger number of motors than generators, the energization of the larger number of substantially synchronous motors from the smaller number of generators being such as to automatically achieve such substantial synchronization of different-positioned propellers as to substantially prevent propeller-synchronization difficulties, and electrical control-means and connections for controllably energizing said propeller-driving motors from said generator or generators.

7. Electrical propulsion-equipment for a multi-propellered aircraft, comprising one or a small number of polyphase synchronous generators and driving-means therefor, said generator or generators having a speed in the range from about 10,000 to about 20,000 revolutions per minute and having a pole-number in the range between 4 and 8, inclusive, a plurality of polyphase propeller-driving motors, located close to their respective propeller-shafts and operating at substantially synchronous speeds for driving a plurality of said propeller-shafts, said generators and motors being of a light-weight construction, each weighing a fraction of a pound per horsepower, there being a larger number of motors than generators, and a common polyphase supply-bus, energized from said generator or generators, for energizing all of said plurality of propeller-driving motors.

8. Electrical propulsion-equipment for a multi-propellered aircraft, comprising one or a small number of polyphase synchronous generators and driving-means therefor, a plurality of polyphase propeller-driving motors, located close to their respective propeller-shafts and operating at substantially synchronous speeds for driving a plurality of said propeller-shafts, said generators and motors being of a light-weight construction, each weighing a fraction of a pound per horsepower, there being a larger number of motors than generators, a polyphase supply-bus, energized from said generator or generators, for energizing a plurality of said propeller-driving motors, and electric power-line attachment means, adapted to be connected to said bus, whereby an additional external source of power may be temporarily connected to the bus during take-off.

9. Electrical propulsion-equipment for a multi-propellered aircraft, comprising one or a small number of polyphase synchronous generators and driving-means therefor, a plurality of polyphase propeller-driving motors, located close to their respective propeller-shafts and operating at substantially synchronous speeds for driving a plurality of said propeller-shafts, said generators and motors being of a light-weight construction, each weighing a fraction of a pound per horsepower, there being a larger number of motors than generators, and a polyphase supply-bus, energized from said generator or generators, for energizing a plurality of said propeller-driving motors, in combination with a relatively stationary source of polyphase power at a frequency at least as high as the normal frequency of said generator or generators, and detachable electrical-conductor means for connecting said relatively stationary source to said bus to temporarily increase the operating-power during take-off.

10. A power plant for driving a plurality of rotating propulsion-propellers for producing a proelling-force in air, said power plant comprising one or a small number of polyphase synchronous generators and driving-means therefor, said generator or generators having a top-speed in the range from about 10,000 to about 20,000 revolutions per minute and having a pole-number in the range between 2 and 8, inclusive, a plurality of propeller-driving polyphase motors, located close to their respective propeller-shafts and operating at a substantially synchronous speed, said generators and motors being of a light-weight construction, each weighing a fraction of a pound per horsepower, there being a larger number of motors than generators, the energization of the larger number of substantially synchronous motors from the smaller number of generators being such as to automatically achieve such substantial synchronization of different-positioned propellers as to substantially prevent propeller-synchronization difficulties, and electrical control-means including variable-pole-number connections for energizing said motors from said generator or generators.

11. A power plant for driving a plurality of rotating propulsion-propellers for producing a propelling-force in air, said power plant comprising one of a small number of polyphase synchronous generators and driving-means therefor, said generator or generators having a top-frequency in the range between 300 and 700 cycles per second, a plurality of propeller-driving polyphase motors, located close to their respective propeller-shafts and operating at a substantially synchronous speed, said generators and motors being of a light-weight construction, each weighing a fraction of a pound per horsepower, there being a larger number of motors than generators, the energization of the larger number of substantially synchronous motors from the smaller number of generators being such as to automatically achieve such substantial synchronization of different-positioned propellers as to substantially prevent propeller synchronization difficulties, and electrical control-means including variable-pole-number connections for energizing said motors from said generator or generators.

LEE A. KILGORE.
FRANK W. GODSEY, Jr.
BENNIE A. ROSE.
FRANK B. POWERS.

REFERENCES CITED

The following references are of record in the file of this patent:

UNITED STATES PATENTS

| Number | Name | Date |
|---|---|---|
| 1,283,684 | Curtis | Nov. 5, 1918 |
| 1,304,229 | Wiard | May 20, 1919 |
| 1,304,289 | Emmet | May 20, 1919 |
| 1,331,940 | Hobart | Feb. 24, 1920 |
| 1,511,448 | Drum | Oct. 14, 1924 |
| 1,834,188 | Thau | Dec. 1, 1931 |
| 1,865,980 | Thau | July 5, 1932 |
| 1,972,486 | Hoover | Sept. 4, 1934 |
| 1,990,017 | Baumgratz et al. | Feb. 5, 1935 |
| 2,070,590 | Goldsmith | Feb. 10, 1937 |
| 2,103,156 | Fraser | Dec. 21, 1937 |
| 2,195,036 | Palmer | Mar. 26, 1940 |
| 2,212,653 | Steward | Aug. 27, 1940 |
| 2,233,634 | Newton | Mar. 4, 1941 |
| 2,257,126 | Rindfleisch | Sept. 30, 1941 |
| 2,265,933 | Adams | Dec. 9, 1941 |
| 2,293,912 | Mullen | Aug. 25, 1942 |
| 2,321,025 | Hammond | June 8, 1943 |
| 2,321,302 | Liwschitz | June 8, 1943 |
| 2,330,733 | Olaszy | Sept. 28, 1943 |

FOREIGN PATENTS

| Number | Country | Date |
|---|---|---|
| 85,484 | Austria | Sept. 10, 1921 |
| 538,386 | Great Britain | July 31, 1941 |
| 114,328 | Australia | Dec. 18, 1941 |